（12） United States Patent
Malcolm

(10) Patent No.: US 9,523,607 B2
(45) Date of Patent: Dec. 20, 2016

(54) METHOD AND APPARATUS FOR TUNING COHERENT RADIATION

(71) Applicant: ITI Scotland—Scottish Enterprise, Glasgow (GB)

(72) Inventor: Graeme Malcolm, Glasgow (GB)

(73) Assignee: ITI SCOTLAND—SCOTTISH ENTERPRISE, Glasgow (GB)

( * ) Notice: Subject to any disclaimer, the term of this patent is extended or adjusted under 35 U.S.C. 154(b) by 149 days.

(21) Appl. No.: 14/407,883

(22) PCT Filed: Jun. 12, 2013

(86) PCT No.: PCT/GB2013/051539
§ 371 (c)(1),
(2) Date: Dec. 12, 2014

(87) PCT Pub. No.: WO2013/186555
PCT Pub. Date: Dec. 19, 2013

(65) Prior Publication Data
US 2015/0185077 A1    Jul. 2, 2015

(30) Foreign Application Priority Data
Jun. 12, 2012   (GB) .................................. 1210342.0

(51) Int. Cl.
G01J 3/46    (2006.01)
G01J 3/10    (2006.01)
(Continued)

(52) U.S. Cl.
CPC ................ *G01J 3/10* (2013.01); *G01J 3/2823* (2013.01); *G02F 1/3532* (2013.01); *G02F 1/39* (2013.01);
(Continued)

(58) Field of Classification Search
CPC ............. G01J 3/10; G02F 1/3532; G02F 1/39; G02F 2001/3548; G02F 1/3558; G02F 2203/05
See application file for complete search history.

(56) References Cited

U.S. PATENT DOCUMENTS 5,912,910 A     6/1999  Sanders et al.
6,356,674 B1 *  3/2002  Davis .................... G02F 1/035
                                                 359/328
(Continued)

FOREIGN PATENT DOCUMENTS

WO    03058337 A1    7/2003

OTHER PUBLICATIONS

Diao, S.Y. et al., "Widely and Continuously Tunable Optical Parametric Generator Based on Mg0-doped Periodically Poled LiNb03 Crystal," Optoelectronics Letters, vol. 2, No. 4, Jul. 2006, pp. 269-272, XP0027138233, Springer Verlag Germany, ISSN: 1673-1905, the whole document.
(Continued)

*Primary Examiner* — Kara E Geisel
*Assistant Examiner* — Maurice Smith
(74) *Attorney, Agent, or Firm* — Perkins Coie LLP

(57) ABSTRACT

A tunable coherent radiation source comprises a pump laser which outputs a pump beam and a non-linear optical medium having a tuning pattern to provide tuning across a wavelength range. A translation system is arranged such that the pump beam is translated across the tuning pattern. The scanning pattern is formed such that translation of the pump beam across the tuning pattern provides one or more discontinuities in tuning across the wavelength range. A spectroscopic system and a hyperspectral imaging system comprising such a tunable coherent radiation source are described, as is a non-linear optical medium adapted for use
(Continued)

in such a source. A method of providing coherent radiation tuned over a wavelength range is also described.

11 Claims, 2 Drawing Sheets

(51) Int. Cl.
| | |
|---|---|
| *G02F 1/35* | (2006.01) |
| *G02F 1/39* | (2006.01) |
| *G01J 3/28* | (2006.01) |
| *H01S 3/06* | (2006.01) |
| *H01S 3/094* | (2006.01) |
| *H01S 3/13* | (2006.01) |
| *H01S 3/16* | (2006.01) |
| *G02F 1/355* | (2006.01) |

(52) U.S. Cl.
CPC ............ *H01S 3/0602* (2013.01); *H01S 3/094* (2013.01); *H01S 3/13* (2013.01); *H01S 3/163* (2013.01); *G01J 2003/2826* (2013.01); *G02F 1/3558* (2013.01); *G02F 2001/3548* (2013.01)

(56) References Cited

U.S. PATENT DOCUMENTS

| | | | |
|---|---|---|---|
| 2005/0195473 A1* | 9/2005 | Nee | G02F 1/3558 |
| | | | 359/333 |
| 2006/0245042 A1* | 11/2006 | Budni et al. | 359/330 |
| 2007/0147443 A1 | 6/2007 | Kung et al. | |
| 2009/0245297 A1* | 10/2009 | Richter | G02F 1/3501 |
| | | | 372/21 |
| 2011/0069375 A1 | 3/2011 | Lin et al. | |

OTHER PUBLICATIONS

Kienle, F. et al., "High-Power, Variable Repetition Rate, Picosecond Optical Parametric Oscillator Pumped by an Amplified Gain-Switched Diode," Optics Express, 2010, vol. 18, No. 8, pp. 7602-7610.

Malcolm, G.P.A et al., "Active Infrared Hyperspectral Imaging System Using a Broadly Tunable Optical Parametric Oscillator," Proceedings of of the SPIE, vol. 7486, 2009, XP00213822, The International Society for Optical Engineering USA, ISSN: 0277-786x, DOI: 10.1117/12.833602, the whole document.

Powers, P.E. et al., "Continuous Tuning of a Continuous-Wave Periodically Poled Lithium Niobate Optical Parametric Oscillator by Use of a Fan-Out Grating Design," Optics Letters, vol. 23, No. 2, Feb. 1, 1998, pp. 159-162, XP000741202, The Optical Society ISSN: 0146-9592, the whole document.

Su, H. et al., "Multigrating Quasi-Phase-Matched Optical Paramentric Oscillation in Periodically Poled MgO:LiNb03 device," Journal of Applied Physics, 2006, vol. 100, pp. 53107-1-53107-3.

Search Report dated Oct. 3, 2014, for GB1210342.0, pp. 1-4.

International Search Report and Written Opinion mailed Oct. 16, 2013, for International Patent Application No. PCT/GB2013/051539 with International Filing Date of Jun. 12, 2013, the whole document.

* cited by examiner

METHOD AND APPARATUS FOR TUNING COHERENT RADIATION

CROSS-REFERENCE TO RELATED APPLICATIONS

This application is a 35 USC §371 application of International Application No. PCT/GB2013/051539 filed Jun. 12, 2013, which claims priority to Great Britain patent application no. GB 1210342.0 filed Jun. 12, 2012, both of which are hereby incorporated by reference in their entirety.

FIELD OF INVENTION

The present invention relates to a method and apparatus for tuning coherent radiation. Aspects of the present invention are particularly suitable for use in an optical parametric oscillator (OPO), especially an OPO used in a spectroscopic system. In specific aspects, the invention is particularly relevant to spectroscopic systems used for the detection of specific materials.

BACKGROUND OF INVENTION

Sources of coherent radiation are used in a very wide variety of applications. In certain applications, such as spectroscopy, it is desirable to produce coherent radiation over a range of different wavelengths, typically by tuning a radiation source over a significant wavelength range. For example, for spectroscopic techniques using molecular rotations and vibrations, such as infrared absorption spectroscopy and Raman spectroscopy, coherent radiation needs to be provided at a specific wavelength necessary to excite a particular transition. This can then be used to detect the presence and concentration of a molecular species.

Tunable laser sources are readily available for the visible spectrum, but it is more difficult to find sources tunable over a significant range in the mid and long wavelength infrared spectrum (abbreviated to MWIR and LWIR respectively). Different definitions exist for these spectral regions, but one exemplary definition sets the MWIR region as the 3-8 µm wavelength band and the LWIR region as the 8-15 µm wavelength band. Optical parametric oscillators (OPO) are a particularly effective type of tunable source of coherent radiation in this wavelength region. An OPO is a system which converts an input pump laser into light beams at two different frequencies by passing it through a nonlinear optical crystal. These two beams are conventionally called the "signal" (the higher frequency beam and thus shorter wavelength beam) and the "idler" (the lower frequency beam and hence longer wavelength)—the sum of the frequencies of the output beams is the frequency of the input pump beam.

A well-established approach to providing a nonlinear optical crystal for use in an OPO for MWIR or LWIR operation is to use a periodically poled grating of birefringent material. Periodic poling involves the formation of a series of layers with alternately oriented ferroelectric domains. The thickness of these layers, and hence domains, is chosen to achieve quasi-phase-matching, which results in an efficient flow of energy from the pump frequency to the signal and idler frequencies. Periodically poled lithium niobate (PPLN) is a particularly preferred choice of nonlinear crystal for use in MWIR OPO operation. The skilled person will be aware of the numerous techniques (e.g. pulsed electric field, electron bombardment, thermal pulsing) available for creating the required periodic structure either during crystal growth or subsequently.

PPLN and similar periodically poled materials can be used to provide an output which can be tuned across a range by appropriate grating design. A preferred approach is to use a fan-out grating, as shown in FIG. 1. In a fan-out grating 1, in one dimension the domains are not uniformly thick but have a monotonically increasing thickness. If the pump laser beam 2 is scanned across the fan-out grating 1 in this dimension then the layer thickness passed through by the pump laser beam 2 varies monotonically (increases monotonically for the scanning direction shown in FIG. 1), and the effective operating wavelength of the OPO also varies monotonically. Using this approach, an OPO can be designed to operate over an extended frequency range (or wavelength range—reference to wavelengths and wavelength ranges will generally be made below, but these could equally be expressed as references to frequencies or frequency ranges). A grating of this type can be used inside or outside a resonant cavity of the OPO—an effective solution, particular for pulsed operation, is to use the grating inside the resonant cavity.

It is desirable to be able to use tunable sources of coherent radiation for real-time spectroscopic applications in extended spectral regions such as the MWIR and LWIR. One use that requires such a capability is hyperspectral imaging—for example, for the real-time detection of one or more molecular species at low concentration at a specific spatial location. In such a use, a conventional tunable source of the type described above may not be effective, as it will not be possible to investigate the necessary extended spectral range with sufficient resolution in a sufficiently short time for real-time detection.

SUMMARY OF INVENTION

Accordingly, in a first aspect the invention provides a tunable coherent radiation source comprising: a pump laser which outputs a pump beam; a non-linear optical medium having a tuning pattern to provide tuning across a wavelength range; and a translation system arranged such that the pump beam is translated across the tuning pattern; whereby the scanning pattern is formed such that translation of the pump beam across the tuning pattern provides tuning of wavelengths over a set comprising predetermined wavelengths, predetermined wavelength subranges, or both, within a broader wavelength range.

A tunable coherent radiation source of this type directly addresses the known problems indicated above, particularly that of gathering data sufficiently rapidly for applications such as real-time hyperspectral imaging, as the tuning pattern can be constructed so as to avoid collecting data from spectral regions that are of no interest.

In a preferred embodiment, the tunable coherent radiation source is an optical parametric oscillator. Preferably, the wavelength range comprises at least a part of either the long wavelength or the medium wavelength infrared spectrum. As indicated above, this is a spectral region both of considerable importance for study (because this is where signature spectral lines in the vibrational spectra of complex molecules are mainly found) and one in which it is difficult to obtain effective tunable sources of coherent radiation.

Preferably, the non-linear optical medium comprises a periodically poled nonlinear crystal. The non-linear may be, for example, formed of periodically poled lithium niobate or of orientation patterned gallium arsenide. These materials are particularly effective for medium wavelength and long wavelength infrared radiation respectively.

Preferably, the non-linear optical medium comprises one or more rows tuned to an output wavelength. This allows for rapid and effective tuning across a wavelength spectrum.

In one arrangement, the tuning pattern provides for tuning to a series of discrete wavelengths within the wavelength range. These discrete wavelengths may for example coincide with key signature spectral lines for particular materials of interest to be detected. Detection of a spectral line at one or more signature wavelengths may be used to represent detection of a particular material of interest. In another arrangement, the non-linear optical medium comprises one or more fan-out gratings allowing continuous tuning across a part of the wavelength range. This arrangement may be useful when the structure within an extended spectral region—for example, an absorption edge—may be a significant feature in detection of the presence or otherwise of a particular material. These two arrangements may be combined in one tuning pattern.

In a second aspect, the invention provides a spectroscopic system, comprising a tunable coherent radiation source as set out above, transmission optics to illuminate a target by a transmission beam from the tunable coherent radiation source, collection optics to collect a received beam from the target illuminated by the transmission beam, and a detection system to detect the received beam and to provide spectral data relating to the target therefrom.

In a third aspect, the invention provides a hyperspectral imaging system comprising: a tunable coherent radiation source as set out above; a scanning system comprising transmission optics to illuminate a target area by a transmission beam from the tunable coherent radiation source, scanning means to scan the transmission beam over the target area in a scanning pattern, and collection optics to collect a received beam from the target area illuminated by the transmission beam; and a detection system comprising a signal detection system to detect the received beam and to provide signal data therefrom, and an image processing system to provide hyperspectral images from the signal data and the scanning pattern. The use of a tunable coherent radiation source of this type allows the detection and data processing demands on such a system to be limited sufficiently to allow a practical real-time hyperspectral imaging system to be constructed.

In a fourth aspect, the invention provides a non-linear optical medium adapted for use in the tunable coherent radiation source as set out above.

In a fifth aspect, the invention provides a method of providing coherent radiation tuned over a wavelength range, the method comprising: outputting a pump beam from a pump laser on to a non-linear optical medium; translating the pump beam across the tuning pattern to provide one or more output beams at output wavelengths determined by the tuning pattern and within the wavelength range; whereby the scanning pattern is formed such that translation of the pump beam across the tuning pattern provides one or more discontinuities in the output wavelengths of the output beams in tuning across the wavelength range.

BRIEF DESCRIPTION OF DRAWINGS

Specific embodiments of the invention will be described below, by way of example, with reference to the accompanying drawings, of which.

DETAILED DESCRIPTION OF SPECIFIC EMBODIMENTS

Embodiments of the invention can be employed in a wide range of systems and are generally advantageous for use in appropriate spectroscopic systems, particularly spectroscopic systems used for detection of specified materials with known spectra. As indicated above, aspects of the invention have particular utility in real-time hyperspectral imaging for detection of known materials, as they can lead to greatly simplified processing in the production of a hyperspectral image, allowing an image to be created in real-time when this would not be possible using conventional techniques. Embodiments of the invention will therefore be described in the context of such a system.

Figure 2:
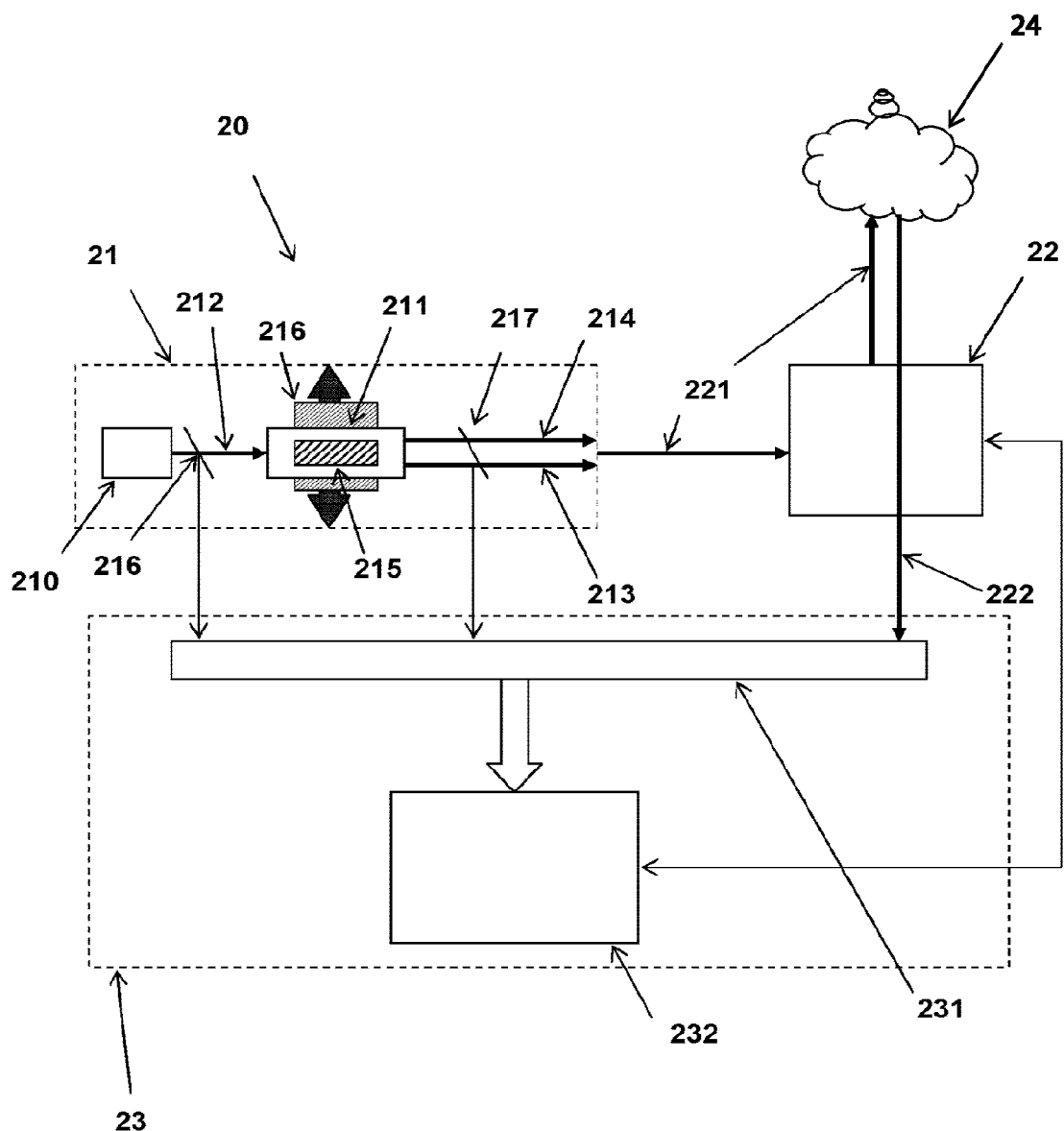
FIG. 2 provides a schematic illustration of a hyperspectral imaging system suitable for use with a tunable coherent radiation source according to an embodiment of the invention.

FIG. 2 shows an exemplary hyperspectral imaging system 20 in which embodiments of the invention can be employed for hyperspectral imaging of an image including a target 24. The hyperspectral imaging system 20 uses LIDAR principles, with backscattered light from the target 24 being detected and processed to determine a spectrum (in this case, an absorption spectrum, though this technique may also be employed using other spectroscopic techniques such as Raman spectroscopy). The spectral information may be used to identify particular materials within the image by spectral signatures, such as particular patterns of lines within their absorption spectrum.

The hyperspectral imaging system 20 has a coherent radiation source system 21 for providing coherent radiation at desired wavelengths, a scanning system 22 for illuminating the target 24 with radiation from the coherent radiation source system 21 and for receiving radiation from the target 24, and a detection system 23 which receives radiation from the target 24 as an input (or set of inputs, depending on the detection system used) and sampled radiation from the coherent radiation source system 21 as another input or set of inputs. Data from the detection system 23 is then processed by image processing system 24 to provide hyperspectral images of the target 24 and detection of particular species within the image.

Subsystems of the hyperspectral imager 20 will now be described in more detail.

The radiation source system 21 comprises a tunable OPO system. A pump laser 210 is used to provide the pump beam 212 for the OPO system. For MWIR or LWIR use this may be a conventional Nd:YAG laser or any other appropriate laser type producing a beam at a similar wavelength—a pulsed laser is provided in the arrangement shown, but a continuous wave laser could also be used with an appropriate system design. A suitable pulsed system may employ a pulse length of the order of 10 ns with a repetition rate of 10-1000 kHz. A nonlinear medium 211 receives the pump beam 212 and outputs an idler beam 213 and a signal beam 214 (these are shown as spatially separated in FIG. 3—this is only for convenience of representation. The nonlinear medium may as discussed be periodically poled lithium niobate in the MWIR region, and may be orientation patterned gallium arsenide (OP-GaAs) in the LWIR region—other nonlinear media with suitable properties may also be used.

Figure 1:
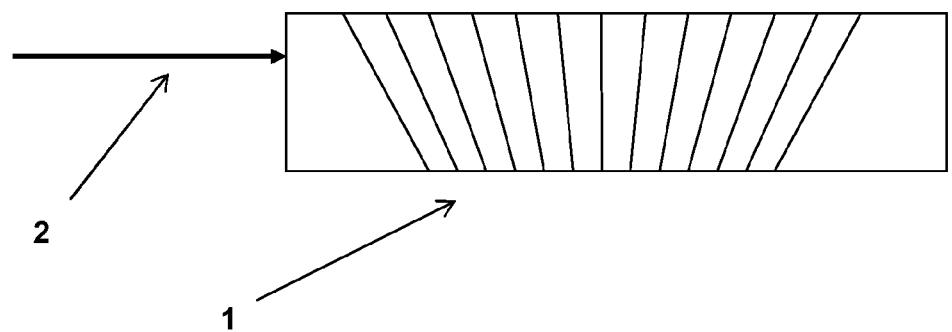
FIG. 1 illustrates a prior art arrangement for scanning a pump laser across a fanout grating to produce a continuously tunable OPO.

In order to provide coherent radiation across a wavelength range, the nonlinear medium 211 is provided with a tuning pattern 215. The tuning pattern 215 varies with a position of incidence of the pump beam 212, so as to produce different wavelengths of idler beam 213 and signal beam 214 for different positions of incidence. The tuning pattern 215 is typically a spatially varying grating structure, such as the fan grating 1 shown in FIG. 1—as discussed below, different tuning patterns are employed in embodiments of the present invention.

To vary the position of incidence of the pump beam 212 on the nonlinear medium 211, a translation system 216 is required to translate the pump beam 212 and the nonlinear medium 211 relative to each other. This may in principle involve either translation of the nonlinear medium 211 (in which case the pump beam 212 can remain fixed) or translating of the pump beam 212 across the nonlinear medium 211 (in which case the nonlinear medium 211 may remain fixed, but beam positioning using suitable mirrors or otherwise will be required at both the input and output side of the nonlinear medium 211). As shown in FIG. 2, the most straightforward approach is to translate the nonlinear medium 211, as this leaves the optical path unchanged. A voice coil system (such as that provided by TILL Photonics) may be used for accurate positioning of necessary components at wavelengths typically used in such systems.

The coherent radiation output beam 221 produced by the radiation source system 21 may comprise the idler beam 213, the signal beam 214, or both. The pump beam 212 and the output beam 221 are sampled at beamsplitters 216 and 217 to provide signals for use in the detection system 23. The output beam 221 is received by the scanning system 22 and used to illuminate the target 24. Different approaches may be employed for illuminating the target 24—one approach is to scan the output beam 221 across a target space in a raster pattern, with this raster information passed to the detection system 23 so that light backscattered from a particular pulse can be identified with a particular part of the target space. The backscattered beam 222 from the target 24 is then received by the scanning system 22, and transmitted to the detection system 23.

With a pulsed system, the sampling of the pump beam 212 and the output beam 221 can be matched together with the backscattered beam 222 relating to the same pulse. This can be implemented with appropriate gating of the detection system 23 based on time of flight. This approach allows for high resolution, as variations between individual pulses do not then affect the results. Preamplification, gating, integration and normalisation of signals may be achieved with appropriate circuitry within the detection system 23, for example a custom-built FPGA 231. The normalised signal data is then compiled together with the raster information received from the scanning system 22 at an image processing system 232 to provide image data. Image data over a plurality of spectral regions provides hyperspectral image data, and hence a hyperspectral image. Such an image provides a spectrum for each image point. The spectrum for each image point (or a collection of image points) may also be analysed to determine the presence or absence of a particular material (for example, on the basis of the presence or absence of particular absorption lines in the spectrum at that image position). When presence or absence of a particular material, this may be represented on the hyperspectral image or in an image derived from it, for example by a predetermined false colour. Intensity of the false colour may be used to represent a determined concentration of a detected material.

If a conventional fanout grating is used as a tuning pattern, producing a hyperspectral image with the instrument of FIG. 2 provides intense processing demands. This is because a large number of data points are sampled across the wavelength range. A significant number of these data points will be in parts of the wavelength range that are of no particular interest—for example, because no species of interest has an absorption line at that wavelength, or even because most species of interest will have an aborption line, but in either case because that part of the spectral range is of no assistance either in determining the presence or absence of a species of interest, or in distinguishing one species of interest from another.

This rapid response is particularly important where detection of volatile species must be carried out rapidly—for example, in detection of escaping petroleum gas products, or in detection of explosive materials from emission of volatile constituents.

Figure 3:
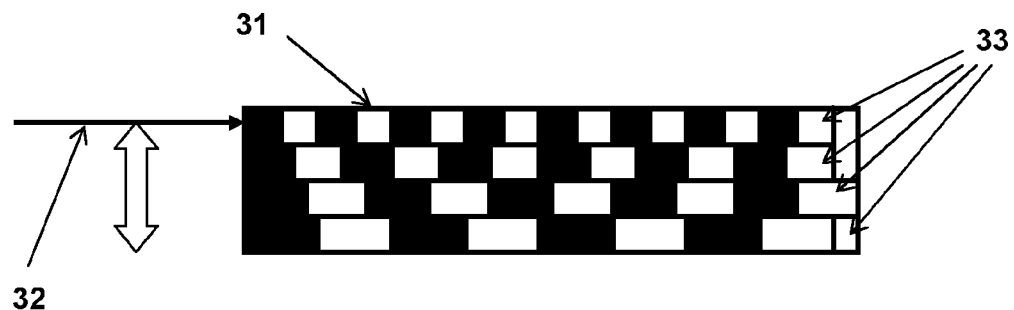
FIG. 3 illustrates a non-linear optical medium with a tuning pattern according to an embodiment of the invention.

A first tuning pattern for use in embodiments of the invention is shown in FIG. 3. This comprises a composite grating structure 31 in which a plurality of rows 33 each comprise a separate grating tuned to a different wavelength. Grating structures of this general type are known, as an alternative to fanout gratings, to provide continuous tuning across a range of wavelengths by variation of temperature, but are not known to provide tuning only over a set of predetermined wavelengths or wavelength subranges within a broader wavelength range. A pump beam 32 translated relative to this grating will thus sample a series of discrete wavelengths—four discrete wavelengths in the example shown in FIG. 3. These wavelengths can be chosen to match the needs of the application—for example, they may be chosen at wavelengths that singly or in combination indicate the presence or absence of particular molecular species.

The pump laser 31 is then transmitted through the nonlinear crystal as it is translated by the translation system 216—the result of transmitting the pump laser 31 through the tuning pattern 31 is to produce light, discontinuously, at a series of wavelengths. The result is a multispectral image at a series of separate wavelengths rather than a full hyperspectral image. Such an image may be used to provide extremely rapid determination of whether a key molecular species is present or absent.

Different approaches to manufacture of such a grating are available. The most straightforward approach is simply to manufacture a series of gratings by any conventional process, such as photolithography, and attach them together. An alternative approach would be to grow the whole grating structure by epitaxial processes.

Figure 4:
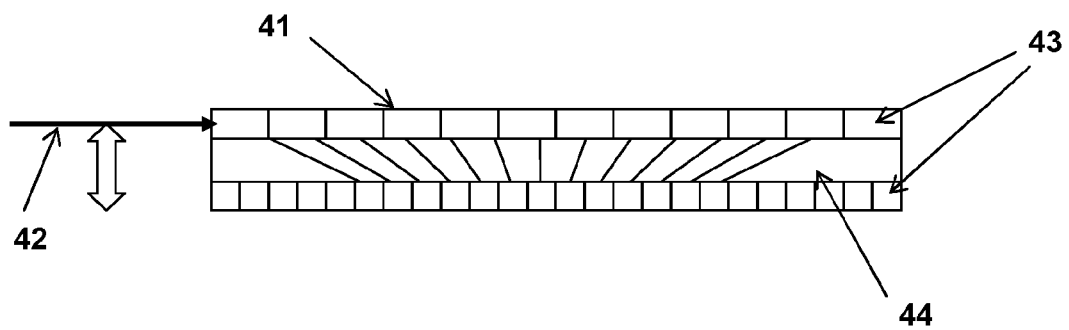
FIG. 4 illustrates a composite structure that includes a fanout grating that is used for part of a spectral range and discrete gratings that are used for other parts of the spectral range according to an embodiment of the invention.

FIG. 4 shows that It is possible to use a composite structure 41, in which a fanout grating 44 is used for part of the spectral range and in which discrete gratings 43 are used in other parts of the spectral range. Translation of the pump beam 41 relative to this structure would provide continuous tuning across a range with additional data points outside the range. This can provide significant benefits in detection, by allowing more sophisticated detection strategies while still sampling much more efficiently than for conventional approaches. For example, organic materials will generally have a significant absorption in the region of 3000 cm$^{-1}$ (C—H stretch vibration), so simple detection of absorption in this region will not typically be useful to distinguish one species from another. However, the shape of this absorption will vary significantly from species to species, so use of a fanout grating across this limited sub-range can provide valuable additional data—for example, the absorption edge for the detected species can be used to distinguish one species from another.

This approach allows for tuning of wavelengths over a set of predetermined wavelengths, or wavelength subranges, within a broader wavelength range. This approach greatly simplifies detection. For each sampled wavelength, the signal can be integrated for a much longer time than for the prior art approach for the same rate of scanning of the pump laser relative to the tuning pattern, and no tuning is required. This allows for much faster imaging and detection of predetermined species than can be achieved with prior art approaches.

The person skilled in the art will appreciate that the arrangement set out above is exemplary, and the alternative design choices may be made without falling outside the scope of the invention as claimed. For example, this approach to tuning can be applied outside a resonant cavity as well as inside a laser cavity. The technique can be used for purposes other than hyperspectral imaging, including non-imaging spectroscopic techniques.

The invention claimed is:

1. A tunable coherent radiation source comprising:
   a pump laser which outputs a pump beam;
   a non-linear optical medium having a tuning pattern to provide tuning across a wavelength range; and
   a translation system arranged such that the pump beam is translated across the tuning pattern;
   whereby the tuning pattern is formed such that translation of the pump beam across the tuning pattern provides tuning of predetermined wavelengths, predetermined wavelength subranges, or both, within a predetermined wavelength range, and whereby the tuning pattern omits tuning of at least one wavelength region within the predetermined wavelength range, and whereby the predetermined wavelength range is within the full wavelength range of the non-linear optical medium.

2. A tunable coherent radiation source as claimed in claim 1, wherein the tunable coherent radiation source is an optical parametric oscillator.

3. A tunable coherent radiation source as claimed in claim 1, wherein the wavelength range comprises at least a part of either the long wavelength or the medium wavelength infrared spectrum.

4. A tunable coherent radiation source as claimed in claim 1, wherein the non-linear optical medium comprises a periodically poled nonlinear crystal.

5. A tunable coherent radiation source as claimed in claim 4, wherein the non-linear crystal is formed of periodically poled lithium niobate.

6. A tunable coherent radiation source as claimed in claim 4, wherein the non-linear crystal is formed or orientation patterned gallium arsenide.

7. A tunable coherent radiation source as claimed in claim 1, wherein the non-linear optical medium comprises one or more rows tuned to an output wavelength.

8. A tunable coherent radiation source as claimed in claim 7, wherein the tuning pattern provides for tuning to a series of discrete wavelengths within the wavelength range.

9. A tunable coherent radiation source as claimed in claim 1, wherein the non-linear optical medium comprises one or more fan-out gratings allowing continuous tuning across a part of the wavelength range.

10. A hyperspectral imaging system comprising:
    a tunable coherent radiation source comprising a pump laser which outputs a pump beam, a non-linear optical medium having a tuning pattern to provide tuning across a wavelength range, and a translation system arranged such that the pump beam is translated across the tuning pattern, whereby the tuning pattern is formed such that translation of the pump beam across the tuning pattern provides tuning of predetermined wavelengths, predetermined wavelength subranges, or both, within a predetermined wavelength range, and whereby the tuning pattern omits tuning of at least one wavelength region within the broader predetermined wavelength range, and whereby the predetermined wavelength range is within the full wavelength range of the non-linear optical medium:
    a scanning system comprising transmission optics to illuminate a target area by a transmission beam from the tunable coherent radiation source, scanner to scan the transmission beam over the target area in a scanning pattern, and collection optics to collect a received beam from the target area illuminated by the transmission beam; and
    a detection system comprising a signal detection system to detect the received beam and to provide signal data therefrom, and an image processing system to provide hyperspectral images from the signal data and the scanning pattern.

11. A method of providing coherent radiation tuned over a wavelength range, the method comprising:
    outputting a pump beam from a pump laser on to a non-linear optical medium having a tuning pattern formed such that translation of the pump beam across the tuning pattern provides tuning of a predetermined wavelengths, predetermined wavelength subranges, or both, within a predetermined wavelength range within the full wavelength range of the non-linear optical medium; and
    translating the pump beam across the tuning pattern to provide one or more output beams at output wavelengths determined by the tuning pattern and within the predetermined wavelength range, wherein the output wavelengths are tuned by the tuning pattern to omit at least one wavelength region within the predetermined wavelength range.

* * * * *